United States Patent
Ando

(10) Patent No.: US 7,675,971 B2
(45) Date of Patent: Mar. 9, 2010

(54) MOVING PICTURE ENCODING APPARATUS AND METHOD, COMPUTER PROGRAM AND COMPUTER-READABLE STORAGE MEDIUM

(75) Inventor: Tsutomu Ando, Zama (JP)

(73) Assignee: Canon Kabushiki Kaisha, Tokyo (JP)

(*) Notice: Subject to any disclaimer, the term of this patent is extended or adjusted under 35 U.S.C. 154(b) by 1344 days.

(21) Appl. No.: 11/121,020

(22) Filed: May 4, 2005

(65) Prior Publication Data

US 2005/0254577 A1    Nov. 17, 2005

(30) Foreign Application Priority Data

May 12, 2004  (JP) .............. 2004-142645

(51) Int. Cl.
*H04N 7/12*    (2006.01)

(52) U.S. Cl. ............. 375/240.03; 375/240; 375/240.01; 375/240.02; 375/240.12

(58) Field of Classification Search ............. 375/240, 375/240.01, 240.02, 240.03, 240.12; 348/562; 382/232

See application file for complete search history.

(56) References Cited

U.S. PATENT DOCUMENTS

| | | | | |
|---|---|---|---|---|
| 5,745,186 | A * | 4/1998 | Shimizu et al. ............. | 348/562 |
| 6,256,413 | B1 | 7/2001 | Hirabayashi ................ | 382/232 |
| 6,888,967 | B2 * | 5/2005 | Sugahara et al. ............ | 382/232 |
| 2003/0028397 | A1 | 2/2003 | Tagashira et al. ............ | 705/1 |
| 2004/0250015 | A1 | 12/2004 | Ando .......................... | 711/112 |

FOREIGN PATENT DOCUMENTS

| | | |
|---|---|---|
| JP | 03-038185 | 2/1991 |
| JP | 05-030536 | 2/1993 |
| JP | 07-322252 | 12/1995 |
| JP | 10-210475 | 8/1998 |
| JP | 2001-339728 | 12/2001 |
| JP | 2003-348588 | 12/2003 |

* cited by examiner

*Primary Examiner*—Allen Wong
(74) *Attorney, Agent, or Firm*—Fitzpatrick, Cella, Harper & Scinto

(57) ABSTRACT

This invention generates encoded data within a required buffer size with minimum deterioration of image quality by finely adjusting a code data size to be generated so that an encoding condition can be changed to one of multiple levels on the basis of a cumulative encoded data size which is being generated during an encoding process of one frame which forms a moving picture. To this end, a VBV buffer zone controller compares a cumulative encoded data size during encoding of one frame with a plurality of thresholds, and outputs the comparison result to a vector processing controller, coefficient processing controller, and quantization controller. The vector processing controller controls a motion detection/compensation unit to fix/not to fix vectors for motion compensation. The coefficient processing controller determines an area size of a plurality of DCT coefficients to be masked, which are obtained by a DCT unit. The quantization controller determines the quantization step size of a quantizer. These vector processing controller, coefficient processing controller, and quantization controller adjust an encoded data size to be generated in multiple levels.

11 Claims, 11 Drawing Sheets

F I G. 3

| ZONE | I-PICTURE | P/B-PICTURE |
|---|---|---|
| 0 | NO PROCESS | NO PROCESS |
| 1 | MAXIMIZE QUANTIZATION SCALE LIMIT TO 4×4 COEFFICIENTS | MAXIMIZE QUANTIZATION SCALE |
| 2 | MAXIMIZE QUANTIZATION SCALE LIMIT TO 2×2 COEFFICIENTS | MAXIMIZE QUANTIZATION SCALE |
| 3 | MAXIMIZE QUANTIZATION SCALE SET ALL AC COEFFICIENTS TO BE ZERO | MB SKIP |

MOVING PICTURE ENCODING APPARATUS AND METHOD, COMPUTER PROGRAM AND COMPUTER-READABLE STORAGE MEDIUM

FIELD OF THE INVENTION

The present invention relates to an encoding technique of a digital moving picture and, more particularly, to a moving picture encoding technique using MPEG (Moving Picture Expert Group).

BACKGROUND OF THE INVENTION

In recent years, many products that perform encoding using formats standardized by MPEG (ISO/IEC SC29/WG11: Moving Picture Expert Group) have been delivered.

FIG. 6 shows the arrangement of a conventional MPEG encoding apparatus. This example shows the arrangement of an MPEG-2 (ISO/IEC 1178-2) encoding apparatus.

Referring to FIG. 6, reference numeral 601 denotes a motion detection/compensation unit, which detects motion between frames, computes an optimal motion vector, and removes spatial redundancy. Reference numeral 602 denotes an inter-frame differentiator which calculates a difference between frames using the motion vector. Reference numeral 604 denotes a reference frame memory which temporarily stores a reference frame image serving as a reference for motion compensation.

Reference numeral 603 denotes a DCT (Discrete Cosine Transform) unit which performs mutual transformations between the time and frequency domains. Reference numeral 605 denotes a quantizer which quantizes DCT coefficients using a predetermined quantization parameter. Reference numeral 609 denotes a coefficient re-arranging unit which re-arranges the quantized DCT coefficients in a predetermined order to provide an effect of prolonging zero runlength. Reference numeral 610 denotes a DC prediction unit which calculates a difference between DC coefficients of neighboring blocks for respective brightness and color difference components in case of only intra-frame encoding.

On the other hand, reference numeral 608 denotes a dequantizer; 607, an IDCT (inverse DCT) unit; and 606, a frame adder. These units form a local decoder.

Reference numeral 611 denotes a variable-length encoder which performs variable-length encoding of DCT coefficients and the like using Huffman codes.

In the above arrangement, respective processing circuits perform processing in units called macroblocks (to be referred to as MBs hereinafter), as indicated by reference numeral 805 in FIG. 8. Upon 4:2:0 sampling, 16×16 pixels of a brightness component and 8×8 pixels of color difference components are handled as MBs. A block is an element which forms an MB, and includes 8×8 pixels. DCT/IDCT transformation is processed using this unit.

As shown in FIG. 8, in MPEG-2, a bitstream has a structure including a picture 803, group of pictures (GOP) 802, and sequence 801 as upper layers of MBs.

A GOP is formed of a plurality of pictures, as shown in FIG. 7, and I-picture (intra-frame encoding), P-picture (forward predictive coded frame), and B-picture (bidirectionally-predictive coded frame) are used as picture types.

In MPEG-2, a VBV (Video Buffer Verifier) buffer model is defined as the behavior of a decoder, as shown in FIG. 9. This guarantees decodability of respective frames in a decoder, and sets a bylaw that a buffer pointer must always be located between the VBV buffer size (upper limit) and 0 byte (lower limit).

By keeping to this bylaw, the decodability of respective frames in the decoder is guaranteed. If the VBV buffer is lower than the lower limit value, a situation in which a bitstream to be decoded by the decoder within a predetermined time is less than one picture occurs. Hence, the decoder becomes undecodable and frame skip occurs. Such frame skip is inhibited in terms of the standard. FIG. 9 shows such situation.

Therefore, in the prior art, a process for controlling the generated code size in I-picture in correspondence with the remaining VBV buffer size while monitoring an output bit count of respective MBs is done. Also, a method of limiting the resolution of an image to be encoded in accordance with the remaining buffer size to suppress the generated code size has been proposed (e.g., Japanese Patent Laid-Open No. 10-210475).

However, in the prior art, as a measure against VBV buffer underflow, a method of controlling a quantization step is adopted, and cannot reliably prevent underflow for every input.

In a method of preventing underflow by modifying the resolution or the like of a source image, image quality abruptly is impaired at the boundary with a normal operation.

SUMMARY OF THE INVENTION

The present invention has been made in consideration of the above problems, and has as its object to provide a technique for generating encoded data within a required buffer size with minimum deterioration of image quality by finely adjusting a code data size to be generated so that an encoding condition is changed to one of multiple levels on the basis of a cumulative encoded data size which is being generated during an encoding process of one frame which forms a moving picture.

In order to achieve this object, a moving picture encoding apparatus of the present invention comprises the following arrangement. That is, there is provided a moving picture encoding apparatus for compression-encoding moving picture data, comprising:

encoding means for performing encoding for respective blocks, each of which includes a plurality of pixels in both horizontal and vertical directions, in one frame that forms a moving picture, in accordance with an encoding parameter serving as an index of an encoded data size;

detection means for detecting information associated with a cumulative size of encoded data during an encoding process of one frame by the encoding means;

comparison means for comparing the detected information with a plurality of different thresholds which are set in advance; and encoding parameter update means for updating the encoding parameter on the basis of a comparison result of the comparison means and correlation between the cumulative size and the plurality of different thresholds.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing the control contents for respective Zones in the first embodiment;

DETAILED DESCRIPTION OF THE PREFERRED EMBODIMENTS

Preferred embodiments of the present invention will now be described in detail in accordance with the accompanying drawings.

Figure 1:
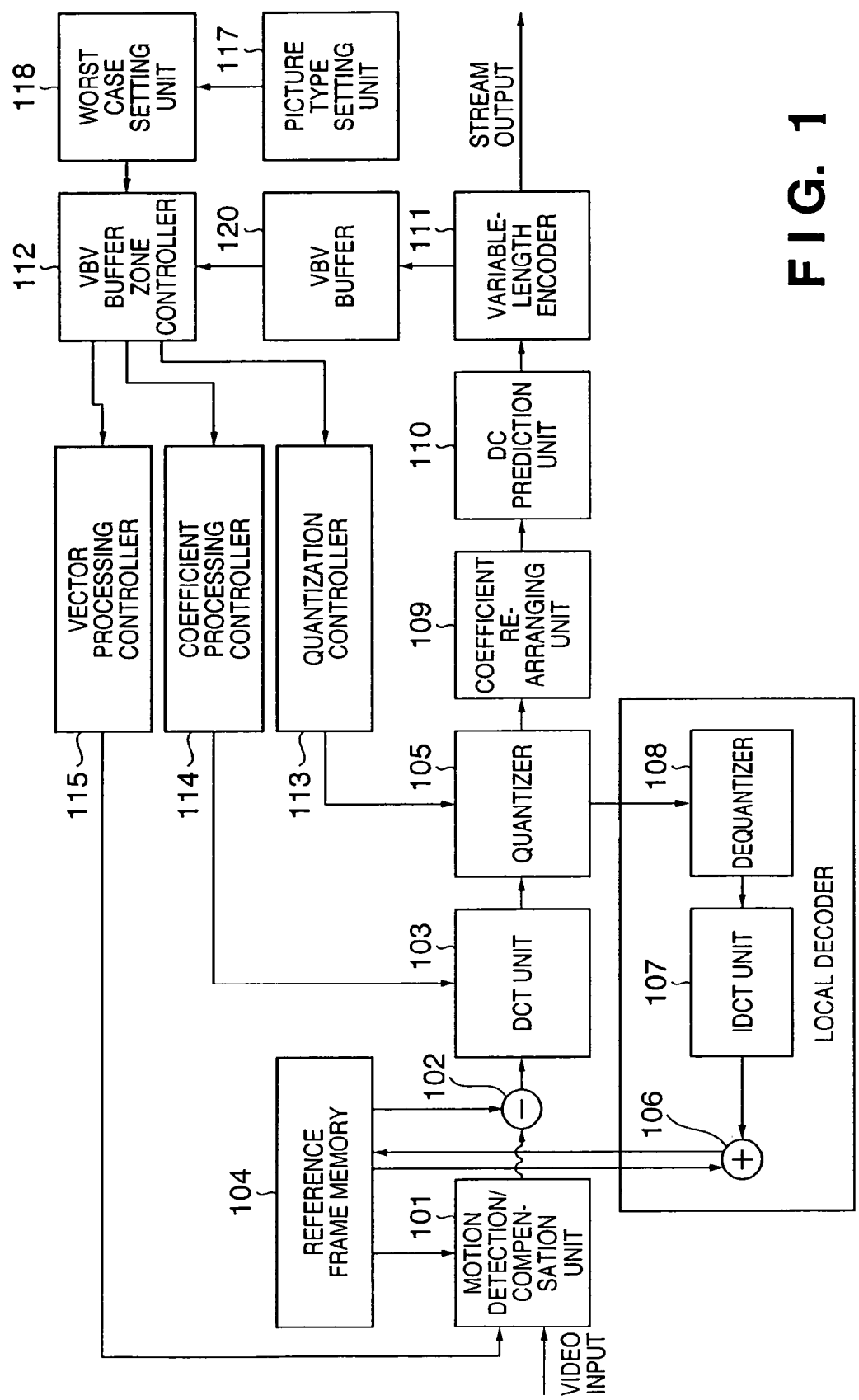
FIG. 1 is a block diagram of a moving picture encoding apparatus according to the first embodiment.
Figure 6:
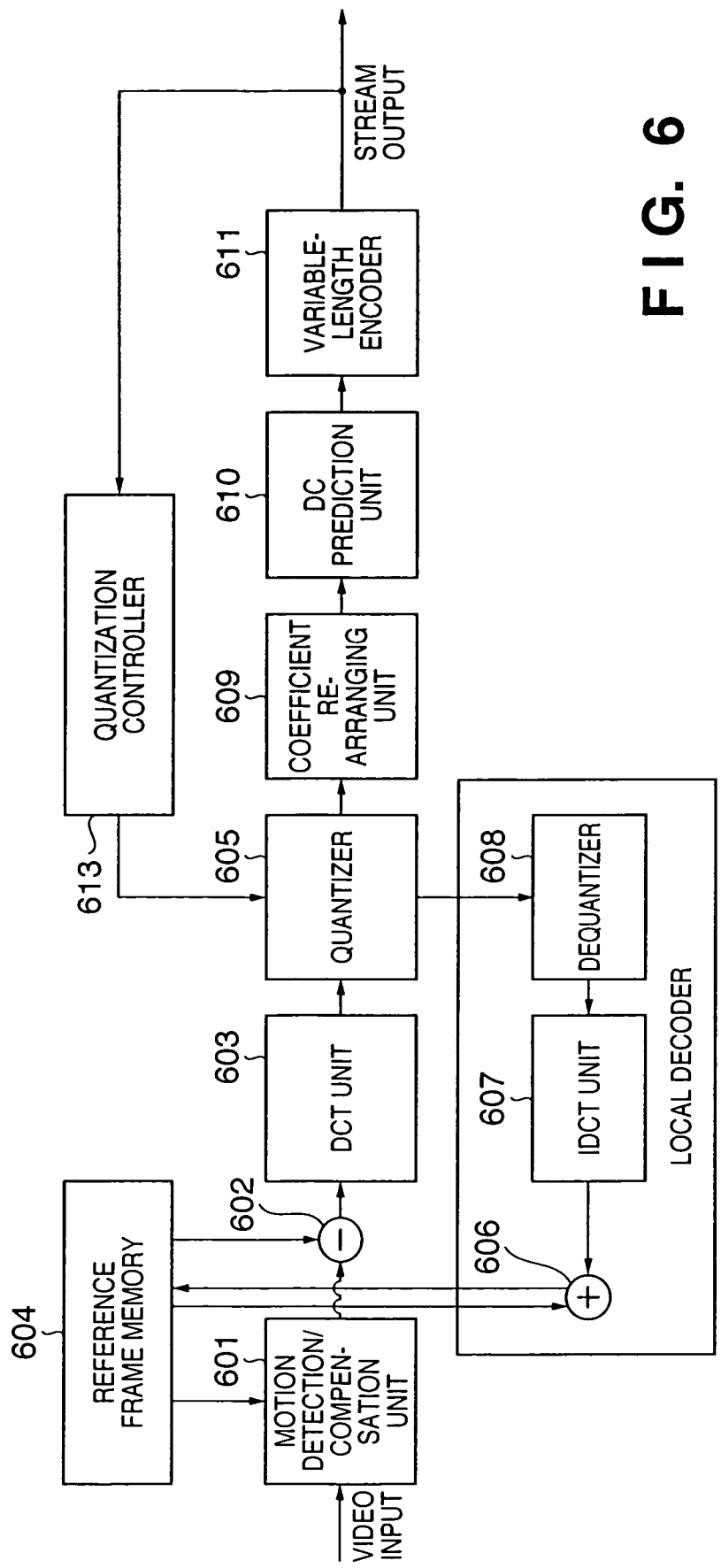
FIG. 6 is a block diagram of a conventional moving picture encoding apparatus.

FIG. 1 is a block diagram of a moving picture encoding apparatus of this embodiment. The same reference numerals in FIG. 1 denote the same parts as in FIG. 6, and a description thereof will be omitted.

Figure 7:
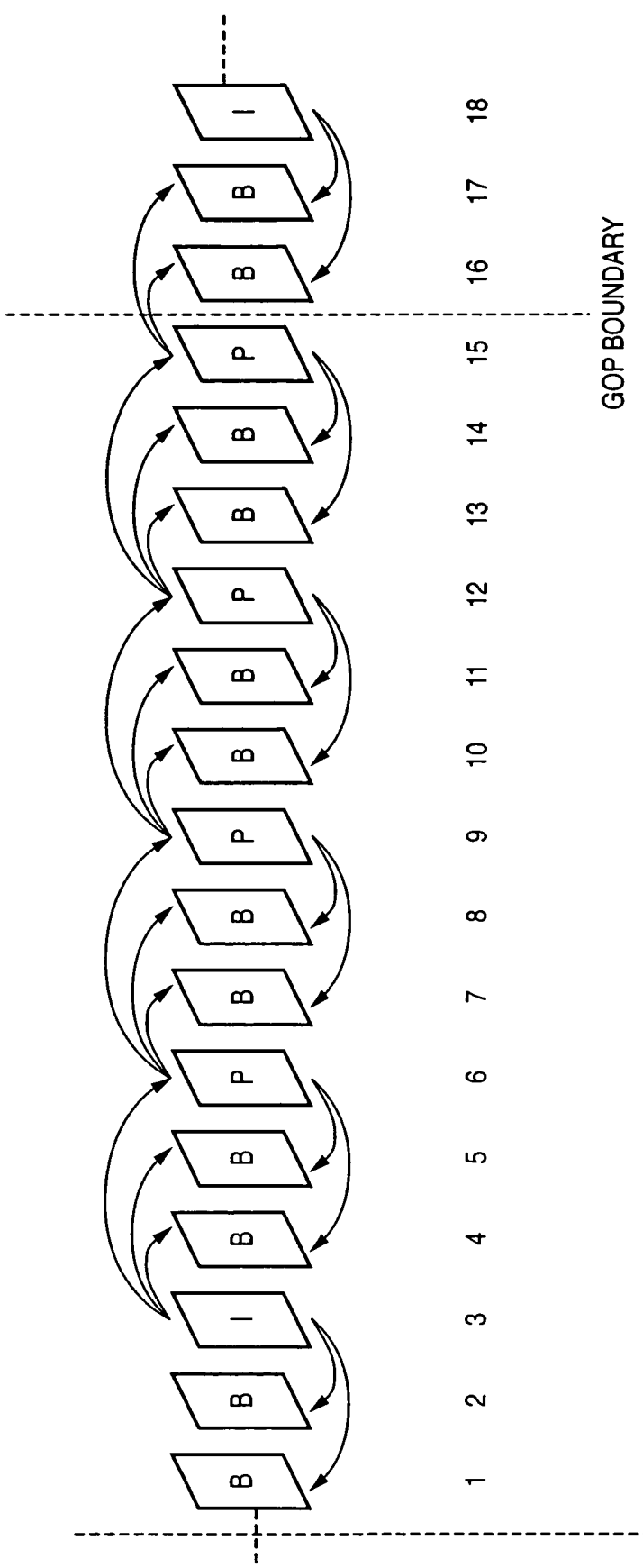
FIG. 7 is a view showing a GOP (Group Of Picture) in a moving picture.
Figure 8:
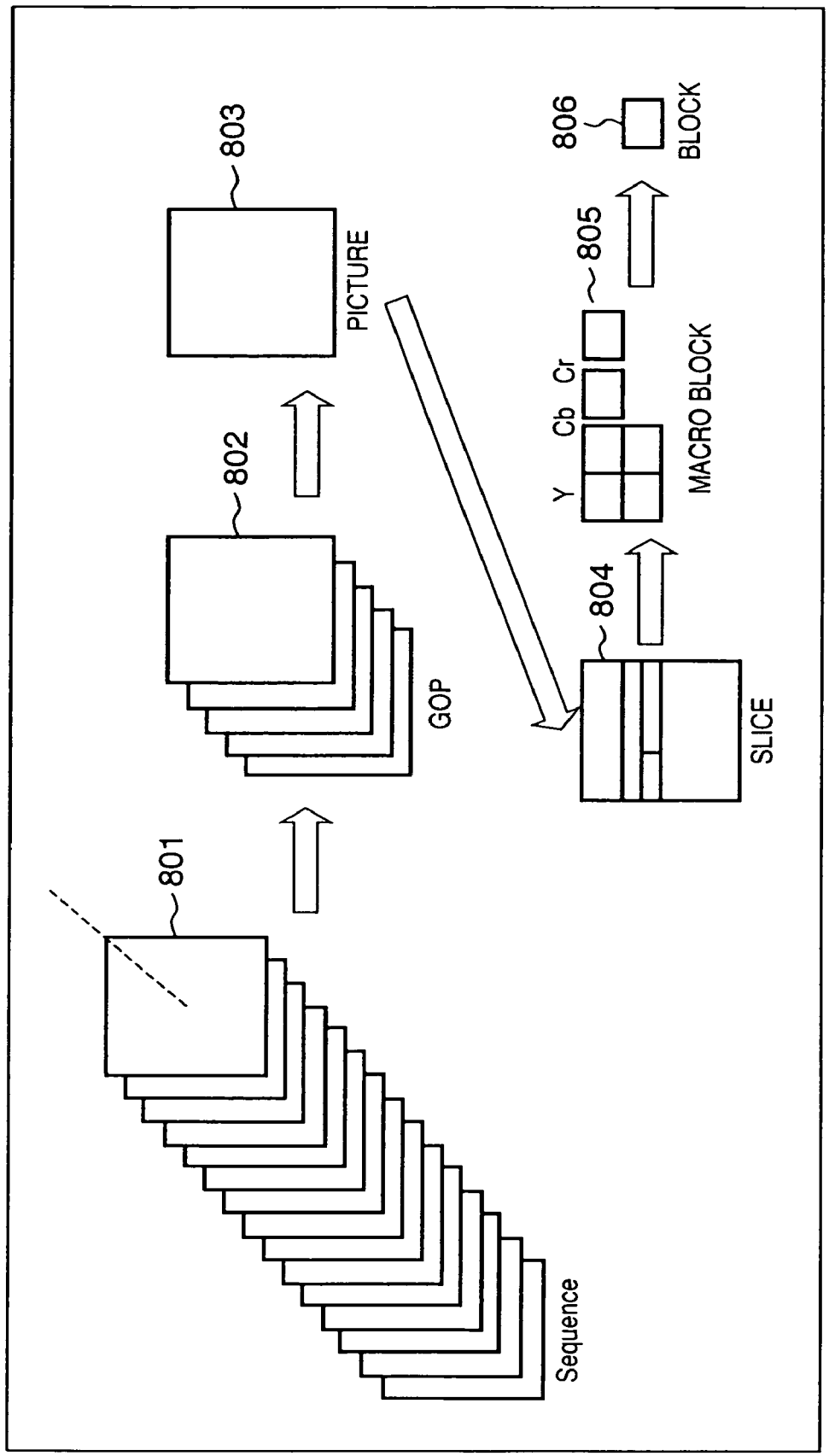
FIG. 8 is a view showing the structure and encoding unit of a moving picture complying with the MPEG standard.
Figure 9:
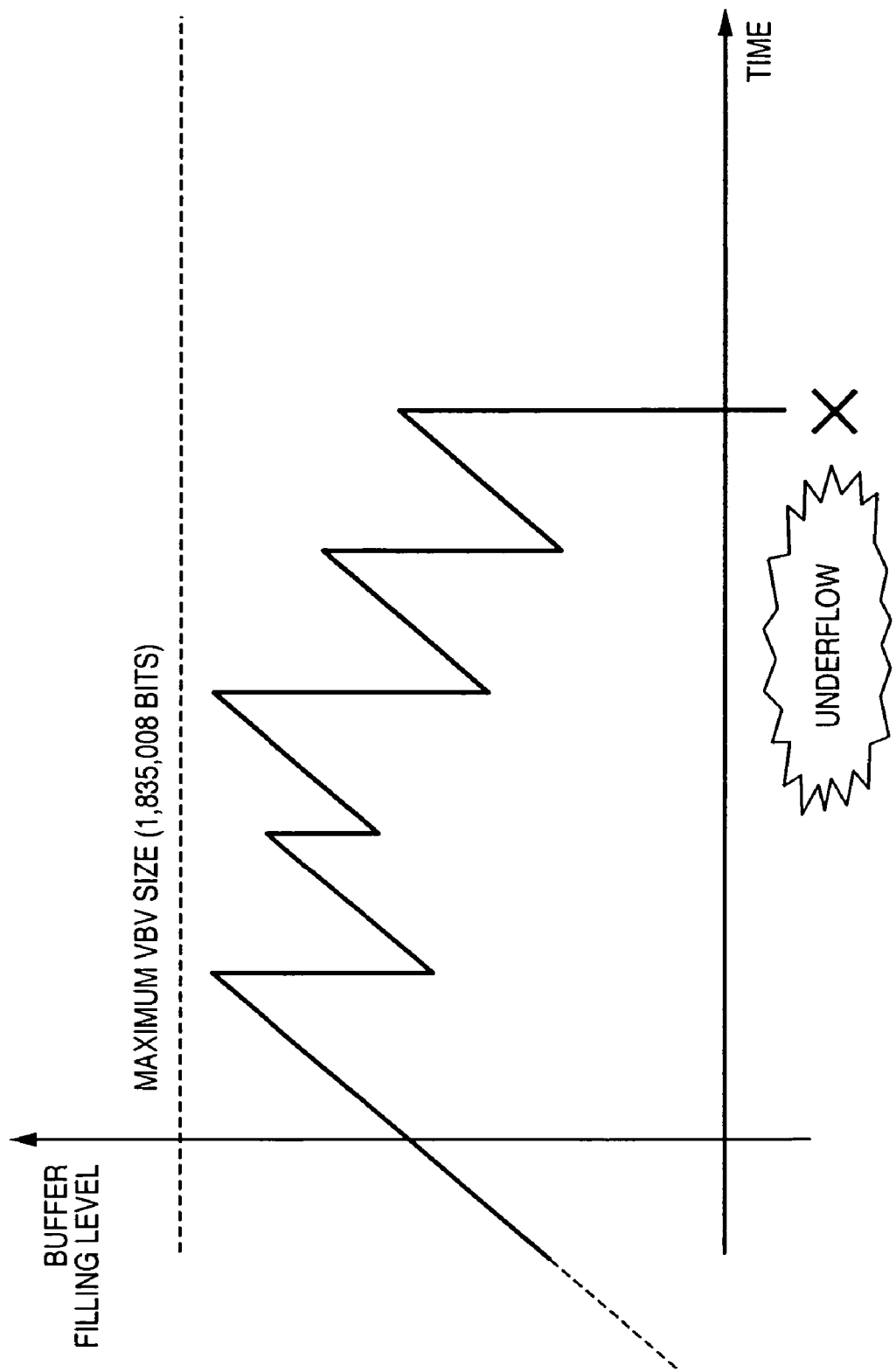
FIG. 9 is a view for explaining underflow of a VBV buffer model.

Referring to FIG. 1, reference numeral 120 denotes a VBV (Video Buffer Verifier) which accumulates an encoded data size generated during an encoding process for one picture (one frame), and is cleared at the beginning (or end) of encoding of one picture. Reference numeral 112 denotes a VBV buffer zone controller as a unit which manages the latest storage position (address) of the VBV 120 which is detected for each encoding of the picture of interest. Reference numeral 117 denotes a picture type setting unit which sets the picture type controlled by an external unit. The picture type-setting unit 117 determines the type (I, P, B) of picture to be encoded in accordance with the order shown in FIG. 7.

Reference numeral 118 denotes a worst case setting unit. This unit records a minimum output bit count for one picture, which is determined in advance depending on the picture type and image size. This minimum output bit count will be referred to as a threshold T1 hereinafter. Since encoding is processed for respective MBs, the threshold T1 when the MB of interest in one picture is the N-th MB is determined by T1=F(N). In this embodiment, this function F(N) is expressed by a linear function F(N)=a×N+b (slope a, segment b) (to be described in detail later).

As for code size suppression, in order to minimize an output code size in P-picture, each MB is set to be "forward motion prediction, non-encoding, zero motion vector", and an MB skip function can be used. However, at the start and terminal ends of a slice, skip is inhibited.

On the other hand, I-picture is limited to a code size reduction function for respective MBs since no MB skip function is available like in P-picture. In practice, a method of replacing all AC coefficients of DCT coefficients by zero, and encoding only DC coefficient components may be used. In this way, by modifying a motion vector and DCT coefficients, a total generated code size for each picture can be suppressed.

Figure 2:
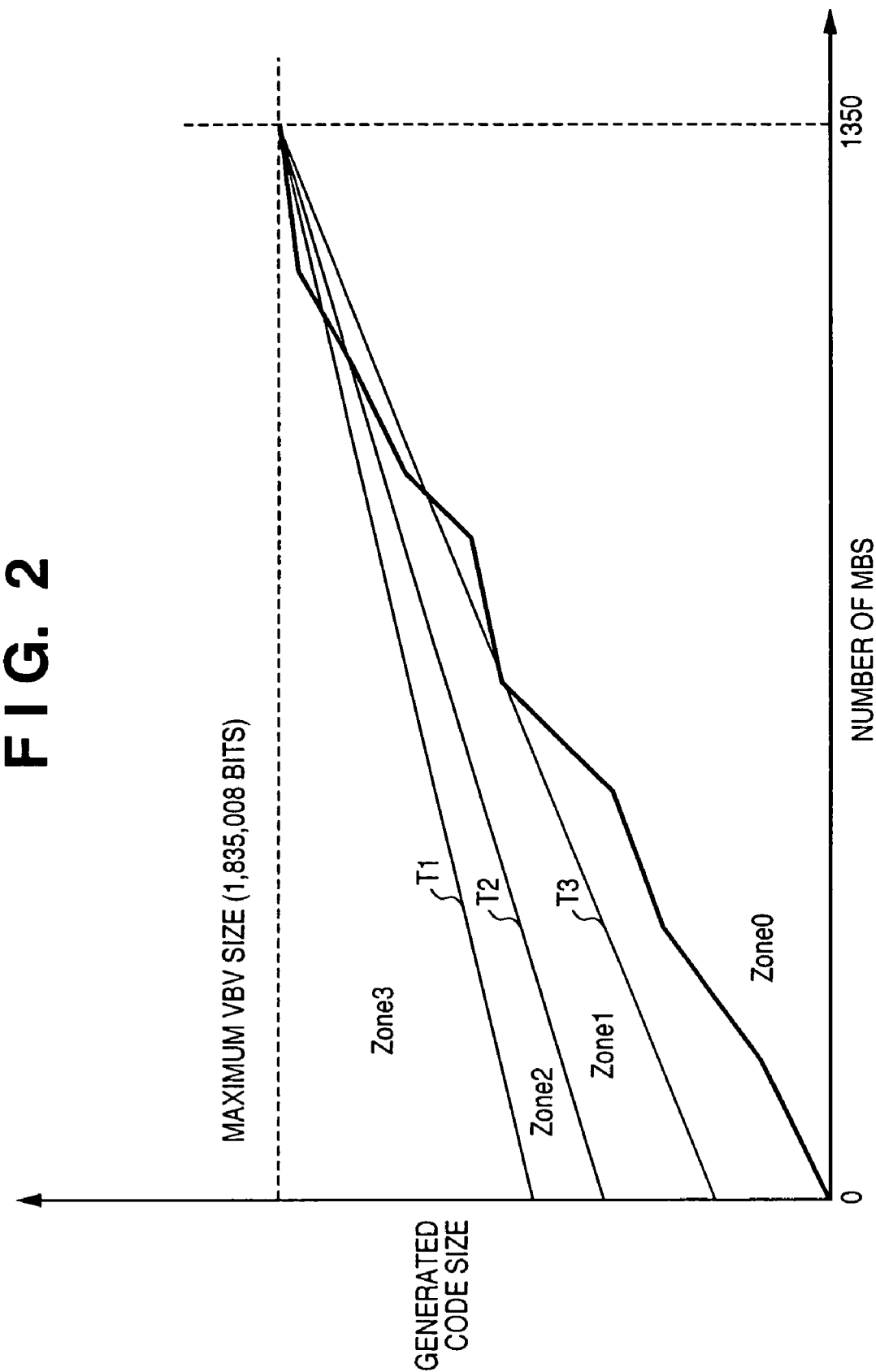
FIG. 2 is a graph showing Zone transition in the first embodiment.

In this embodiment, a function of further setting two thresholds T2 and T3 on the basis of the bit count of the worst case, as shown in FIG. 2, is provided. In this embodiment, the threshold T2 assumes a value 80% of the threshold T1, and the threshold T2 assumes a value 70% of the threshold T1. The setting value of the threshold T1 is uniquely determined by a processing method, but those of the thresholds T2 and T3 are not limited to the above values and other ratios may be used.

For reference's sake, in this embodiment, the thresholds T2 and T3 are determined using linear functions as in the threshold T1. Since the generated code size is monitored using three thresholds, it can be divided into four zones. If the individual zones are defined by Zones 0 to 3, the respective relationships are as follows:

Zone 3≧T1

T2≦Zone 2<T1

T3≦Zone 1<T2

Zone 0<T3

In this embodiment, the number of pictures per picture of a moving picture is 720×480 pixels. Therefore, the number of MBs per picture is 1350 (=1350×480/16/16). To which level encoding of one picture progresses can be determined by the MB of interest to be encoded. Therefore, when the abscissa plots the number of MBs, and the ordinate plots the code size stored in the VBV 120, the respective Zones can be expressed by the relationship shown in FIG. 3.

As shown in FIG. 3, when the code size stored in the VBV 120 is equal to or lower than the threshold T3 (Zone 0), a normal operation is done.

When the code size falls within the range between the thresholds T3 and T2 (Zone 1), the quantization scale is maximized. Then, I-picture is limited to 4×4 blocks including a DC component of 8×8 DCT coefficients, and other 48 coefficients are masked to zero. The quantization steps of P- and B-pictures are fixed to maximum values.

When the code size falls within the range between the thresholds T2 and T1 (Zone 2) and the picture of interest is I-picture, DCT coefficients are limited to 2×2 blocks, and the quantization scales of P- and B-pictures are maximized.

When the buffer filling level exceeds the threshold T1 (Zone 3), underflow is more likely to occur, and a worst case process is executed. More specifically, all AC coefficients except for a DC component of DCT coefficients are set to be zero in case of I-picture, and all skippable MBs undergo a skip process in P- and B-pictures.

Figure 11A:
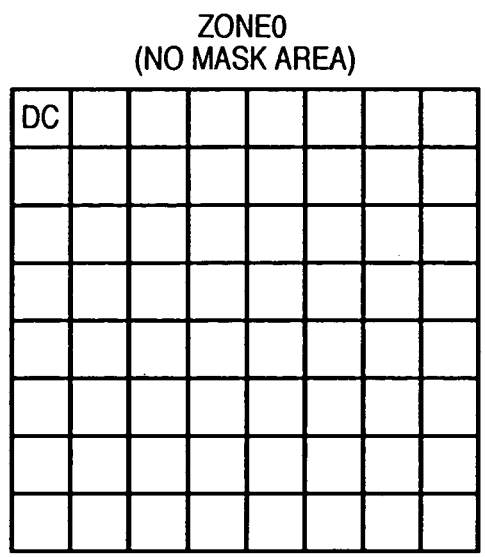
FIGS. 11A to 11D show the relationship between the buffer filling level and mask area of DCT coefficient.
Figure 11B:
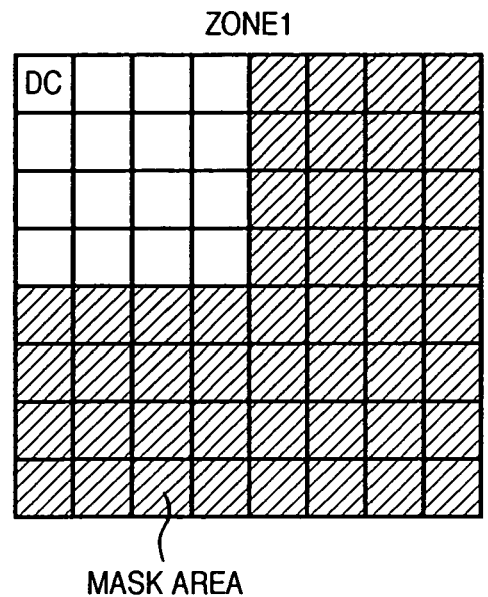
Figure 11C:
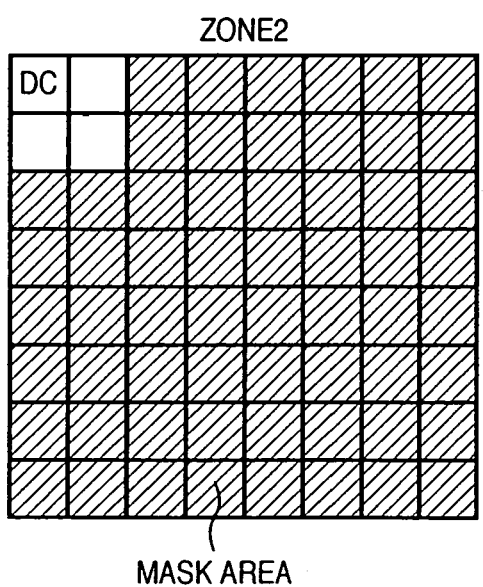
Figure 11D:
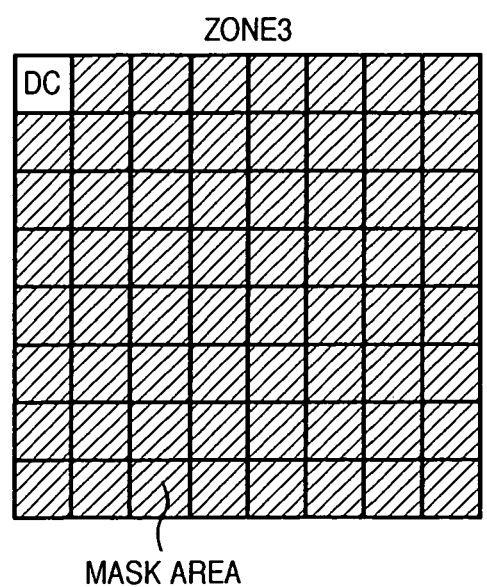

FIGS. 11A to 11D show the relationship between the buffer filling level and mask areas. FIG. 11A shows the case of Zone 0, and indicates that all 8×8 DCT coefficients are used. On the other hand, FIG. 11D shows the case of Zone 3, and indicates that all-AC components of DCT coefficients are masked to zero to leave only a DC component. FIGS. 11B and 11C show mask areas of Zones 2 and 3.

The aforementioned determination is made by the VBV buffer zone controller 112. A vector processing controller 115, coefficient processing controller 114, and quantization controller 113 are controlled on the basis of the determination result.

The quantization controller 113 controls the quantization step to be a normal step or maximum step in accordance with an instruction from the VBV buffer zone controller 112. Likewise, the coefficient processing controller 114 controls a DCT unit 104 to output 8×8, 4×4, 2×2, or 1×1 (only a DC component) coefficients or coefficient in accordance with an instruction from the VBV buffer zone controller 112. The same applies to the vector processing controller 115 and issues an MB skip instruction, an instruction for forcibly setting motion vector values to be a fixed value, and the like to a motion detection/compensation unit 101. More specifically, processes for setting all motion vector values to be zero in P-picture, making motion vector values assume the same values of those of a previous MB in B-picture, and the like are executed.

Figure 4:
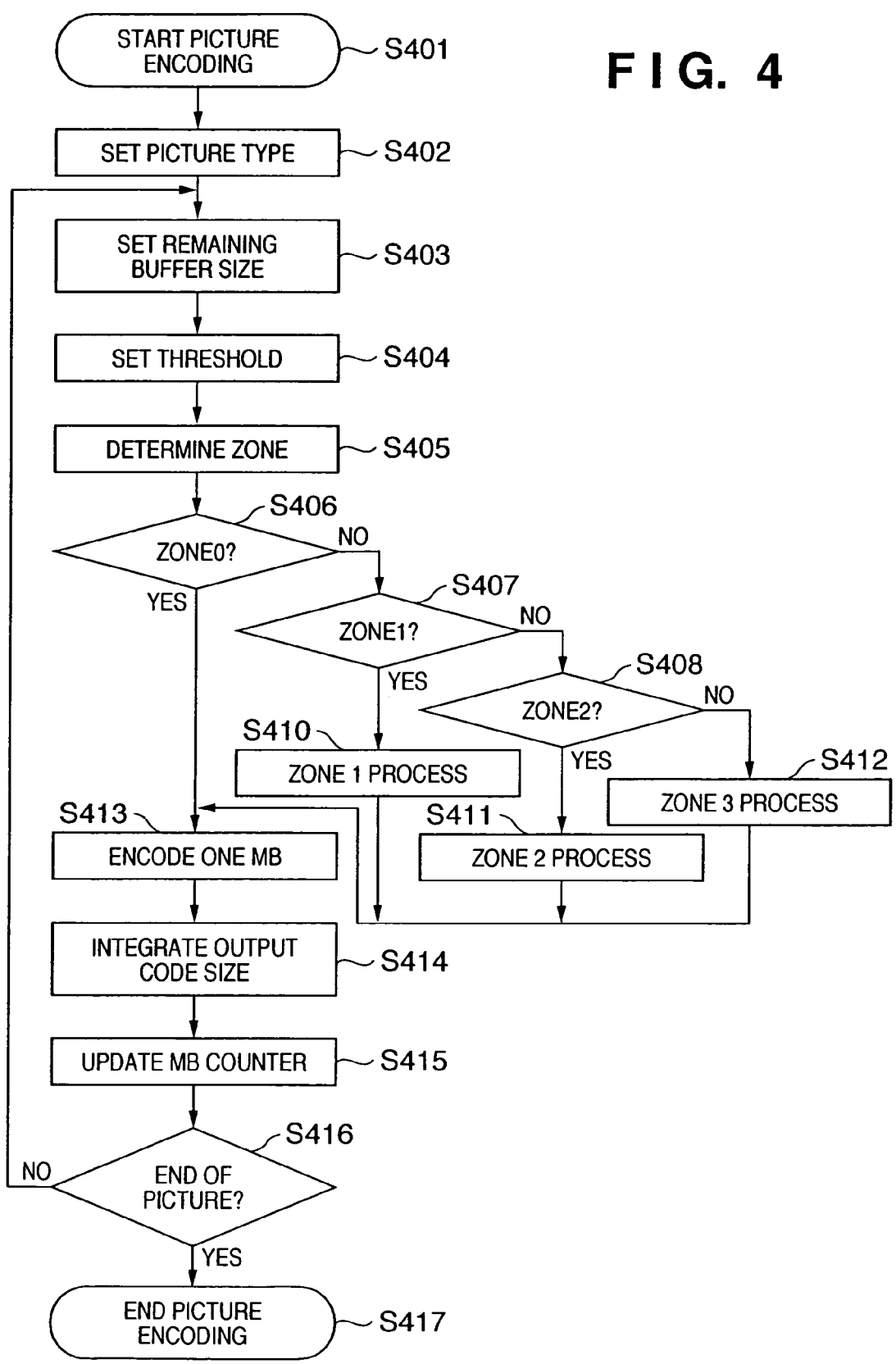
FIG. 4 is a flowchart showing the encoding processing sequence of one picture in the first embodiment.

The processing of the moving picture encoding apparatus of this embodiment will be described below with reference to the flowchart of FIG. 4. FIG. 4 shows only the encoding process for one picture.

Step S401 is an encode start phase of one picture.

In step S402, the picture type is set, an initial value "1" is set in a counter N used to count the number of MBs, and the VBV buffer 120 is cleared. In step S403, the code data size stored in the VBV buffer 120 is confirmed (detected).

In step S404, the thresholds T1, T2, and T3 are determined based on the value of the counter N.

Step S405 is a Zone determination phase, and the flow advances to phases for determining the current address position of the VBV buffer 120, i.e., Zone in which the code size of the picture of interest falls. Steps S406 to S408 are determination phases of respective Zones. The Zone (FIG. 3) in which the current code size is located is determined in steps S410 to S412. An encoding process is determined based on the determined Zone (step S410, S411, or S412). If the current code size falls within Zone 0, a change in quantization step, masking of DCT coefficients, and the like are not performed.

Step S413 is a phase for encoding one MB. In step S414, an integration S of one to N code sizes of the picture of interest is calculated. In step S415, the MB counter N is incremented by 1.

Step S416 is an encode end determination phase of one picture. In this embodiment, since one picture includes 1350 MBs, it is checked if N>1350. If N≦1350, the processes in step S403 and subsequent steps are repeated. Note that the maximum VBV buffer level is specified to be 1,835,008 bits.

FIG. 2 shows a transition example of:

Zone 0→Zone 1→Zone 0→Zone 1→Zone 2→Zone 3 during encoding of one picture.

As a result, according to this embodiment, the image quality and resolution level can be controlled and the output code size can be suppressed before the worst case is reached. Therefore, in a decoding apparatus, the VBV buffer hardly causes underflow, and a smooth moving picture can be played back.

Second Embodiment

The second embodiment will be described below. The second embodiment is characterized by further devising the code size output suppression of I-picture.

Figure 10:
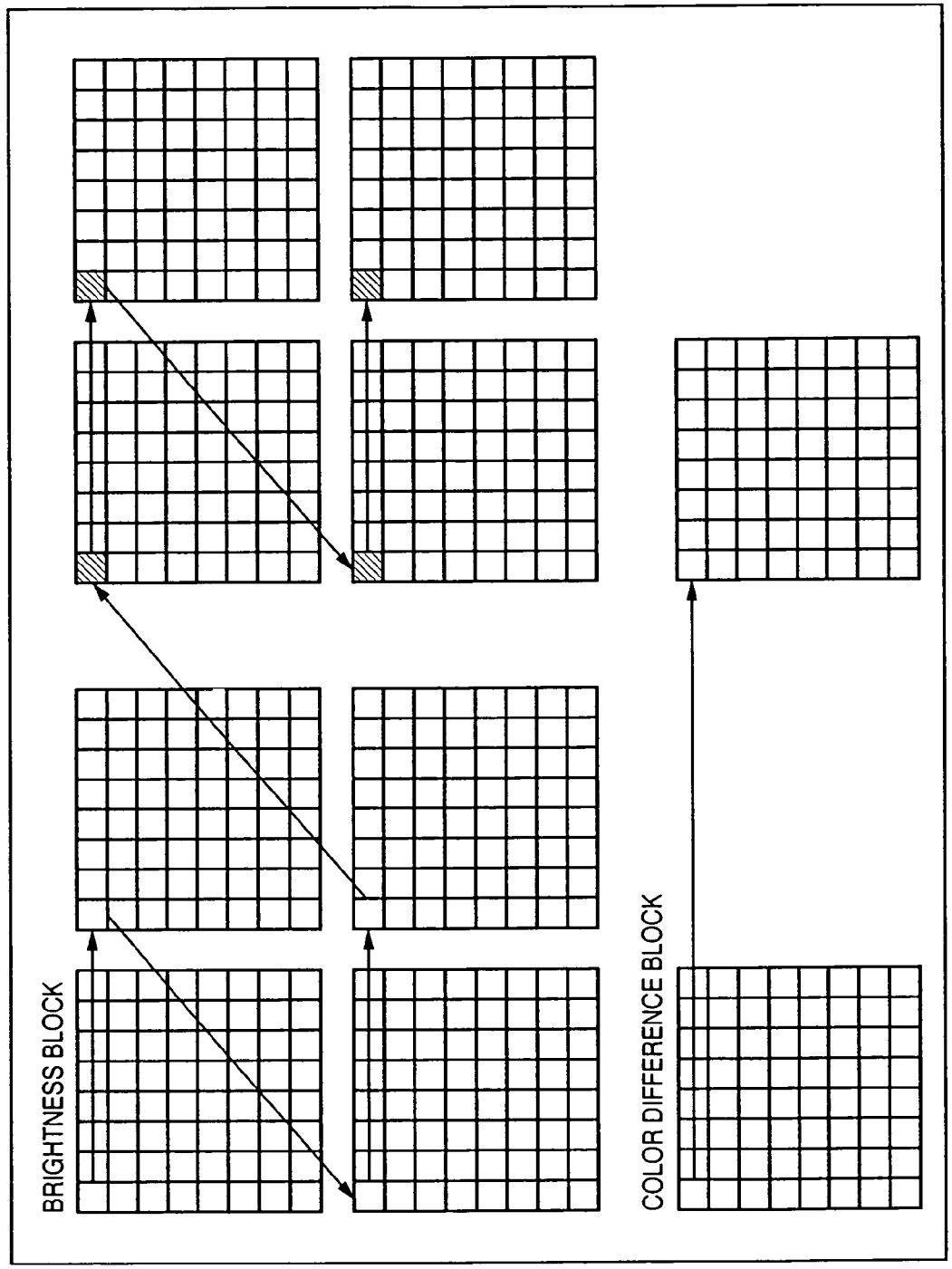
FIG. 10 is a view for explaining the processing contents of DC predictive encoding in the second embodiment.

In the MPEG standard, a process called DC prediction is made. FIG. 10 shows this process. In DC prediction, a difference from the DC component of a previous block is calculated for each component, and this difference value is encoded. In the first embodiment, the number of AC coefficients to be set to be zero other than the DC component in I-picture is changed stepwise. In the second embodiment, four brightness blocks that form an MB have a common DC component. As a method of determining this DC component, a method of averaging the DC components of four blocks, a method of using the DC component value of the upper left block in all brightness blocks, and the like may be used.

With this process, even when correlation among blocks is low, the DC component of a block predicted by DC prediction can be handled as zero, and a code size generated by the DC component can be further reduced. In this case, the resolution of a brightness component is further halved to that of the control in Zone 3 in the first embodiment. Likewise, in color difference components, since the same DC component as that in a previous MB is used, the code size reduction by DC prediction can be similarly attained. In general, since the color difference components are insensitive compared to a brightness component in terms of visual characteristics, a Zone control method that performs a DC commonization process of color difference components beforehand may be adopted.

Figure 5:
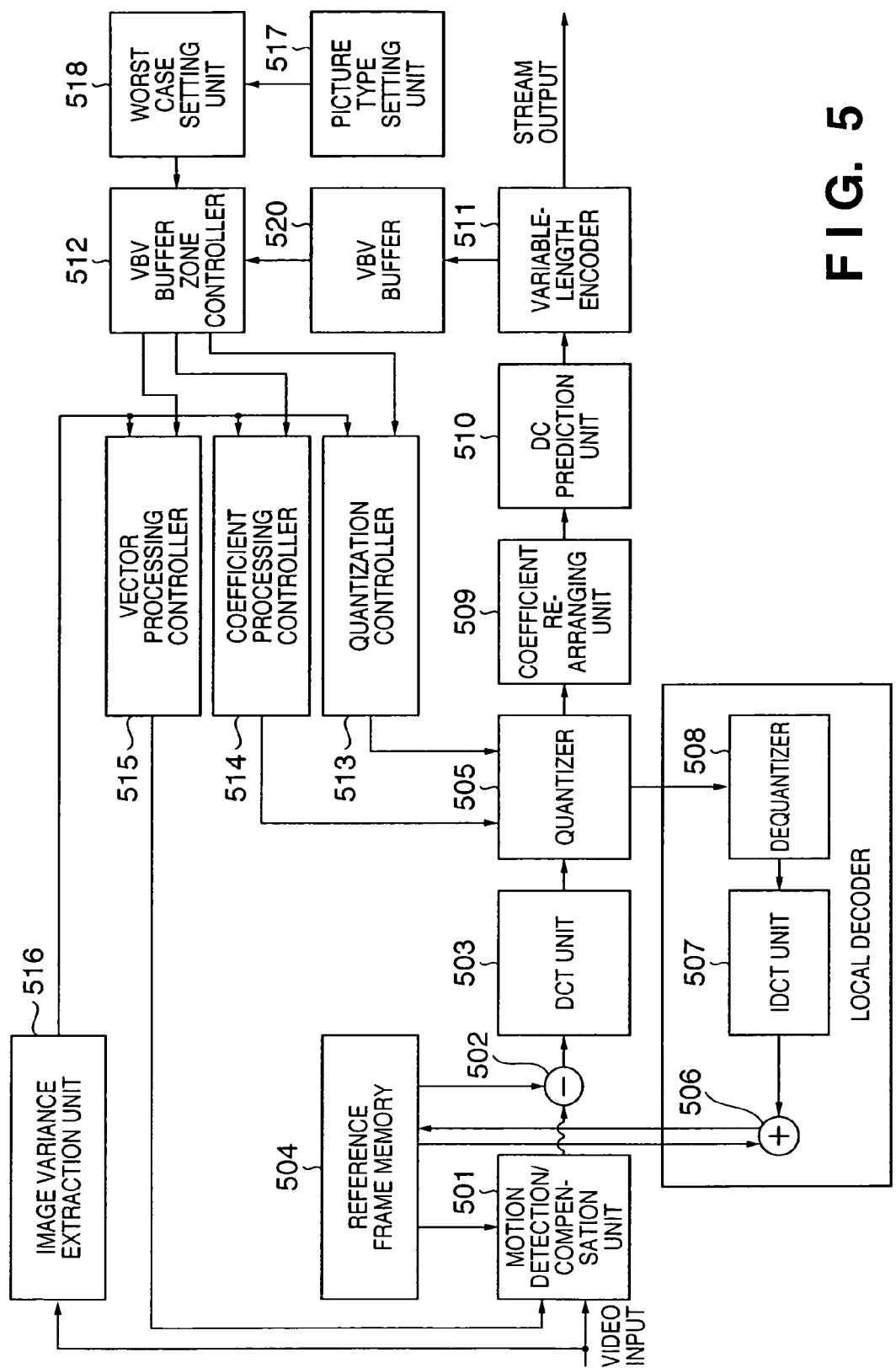
FIG. 5 is a block diagram of a moving picture encoding apparatus according to the second embodiment.

In the second embodiment, an image variance extraction unit 516 is added, as shown in FIG. 5. Since reference numerals 501 to 520 except for the image variance extraction unit 516 are the same as reference numerals 101 to 120 in FIG. 1, a description thereof will be omitted.

In the first embodiment shown in FIG. 1, the code size reduction function is adaptively applied when the buffer level exceeds each threshold. In the second embodiment, variance information of the entire picture is calculated in advance, and when this information is larger than a predetermined value, the code size reduction operation is performed from the beginning of encoding.

That is, a VBV buffer zone controller 512 performs zone determination as in the first embodiment. When the variance information of the entire picture is larger than the predetermined value, the image variance extraction unit 516 informs a vector processing controller 515, coefficient processing controller 514, and quantization controller 513 of a Zone number obtained by incrementing the determined Zone number by 1. For example, when the VBV buffer zone controller 512 determines that the code size up to the current MB falls within Zone 1, the unit 516 informs the respective processors of Zone 2 obtained by adding "1" to it. Put simply, the determination result output from the VBV buffer zone controller 512 is adjusted (by giving an offset).

If such code size reduction function (=resolution deteriorating operation) is intentionally applied to a normal video picture, a problem is posed in terms of image quality. Therefore, this function is enabled only when it is determined that noise is superimposed on the entire picture and no problem is posed even if image quality impairs (or when the user designates this function by an instruction key or the like (not shown)). On the contrary, buffer model control can be made in an early stage of picture encoding.

Note that the image variance extraction unit 516 may be inserted between a video input terminal and the motion detection/compensation unit 501 to supply a result delayed by one picture to the motion detection/compensation unit 501. In this case, the same picture need not be input twice.

As described above, according to the second embodiment, more flexible VBV filling control can be made.

The first and second embodiments have been described. However, the present invention is not limited to the number of threshold values and their correlation described in the embodiments. In short, the code size to be generated can be adjusted in three or more Zones in accordance with the filling level in the VBV buffer of the code size to be generated upon encoding one picture. As shown in FIG. 3, the number of quantization steps in the quantizer 105 is two, but it may be three or more.

In each of the above embodiments, the apparatus having the arrangement corresponding to FIG. 1 or 5 has been exemplified. Alternatively, the present invention may be implemented by software corresponding to FIG. 1 or 5. For example, such software corresponding to FIG. 1 or 5 may be installed as an application program which runs on a general-purpose information processing apparatus such as a personal computer or the like, or may be installed in a digital video camera in some cases.

Normally, since a computer program that runs on an information processing apparatus can be executed by setting a computer-readable storage medium such as a CD-ROM or the like, which stores the program, in a computer and by copying or installing the program in the system, such computer-readable storage medium is also included in the scope of the present invention.

As described above, according to the present invention, an encoded data size is generated within a required buffer size with minimum deterioration of image quality by controlling the encoding processing condition in multiple levels on the basis of the code size generated during an encoding process for one picture (one frame), thus allowing the control that fills the VBV buffer model.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-142645 filed on May 12, 2004, the entire contents of which are hereby incorporated by reference herein.

What is claimed is:

1. A moving picture encoding apparatus for compression-encoding moving picture data, comprising:
   an encoding unit that performs encoding for respective blocks, each of which includes a plurality of pixels in both horizontal and vertical directions, in one frame that forms a moving picture, in accordance with an encoding parameter serving as an index of an encoded data size;
   a picture type setting unit that sets a picture type of the frame to be encoded by said encoding unit;
   a detection unit that detects information associated with a cumulative size of encoded data during an encoding process of the frame by said encoding unit;
   a comparison unit that compares the detected information with a plurality of thresholds which depend on the picture type set by said picture type setting unit and are used for defining a plurality of zones, each of which indicates the level of the amount of encoded data in the encoding progress of said encoding unit, where the plurality of thresholds for each picture type are set in advance; and
   an encoding parameter update unit that updates the encoding parameter on the basis of a comparison result of said comparison unit if the zone to which the information detected by said detection unit belongs changes.

2. The apparatus according to claim 1, wherein said encoding unit generates encoded data by reducing a resolution of color difference values in preference to a brightness value in the block as the unit for encoding.

3. The apparatus according to claim 1, wherein said encoding unit comprises:
   (a) a motion detection/compensation unit that performs motion detection/compensation;
   (b) a DCT transformation unit that computes DCTs of a block which has undergone a compensation process of said motion detection/compensation unit;
   (c) a quantization unit that quantisizes DCT coefficients computed by said DCT transformation unit; and
   (d) an entropy encoding unit that entropy-encodes the DCT coefficients quantized by said quantization unit, and
   wherein the encoding parameter includes information used to determine a motion compensation vector in said motion detection/compensation unit, information used to determine a size of an area of a plurality of DCT coefficients which are computed by said DCT transformation unit and are to be masked by zero, and information used to determine a quantization step upon quantizing by said quantization unit.

4. The apparatus according to claim 1, wherein said encoding unit further comprises an intra-frame encoding unit and an inter-frame difference encoding unit, and
   wherein said inter-frame difference encoding unit can select whether or not a code for each block is to be generated.

5. The apparatus according to claim 4, wherein said encoding unit fixes values of DC coefficients to be a constant value in a plurality of blocks, of DCT coefficients included in the plurality of blocks in a frame of interest upon encoding using said intra-frame encoding unit.

6. The apparatus according to claim 4, wherein said encoding unit processes blocks in a frame of interest as non-encoding blocks upon encoding using said inter-frame difference encoding unit.

7. The apparatus according to claim 1, wherein a largest threshold of the plurality of thresholds represents a minimum code size which must be generated for a block to be encoded.

8. The apparatus according to claim 1, wherein said detection unit detects a filling level to a VBV (Video Buffer Verifier).

9. The apparatus according to claim 1, further comprising:
   a calculating unit that calculates a variance of pixels of a whole image to be encoded; and
   an adjustment unit that adjusts the encoding parameter to be updated by said encoding parameter update unit on the basis of whether or not the calculated variance is larger than a predetermined value, prior to encoding of a frame of interest by said encoding unit.

10. An apparatus-implemented moving picture encoding method for compression-encoding moving picture data, comprising:
   an encoding step of performing encoding for respective blocks, each of which includes a plurality of pixels in both horizontal and vertical directions, in one frame that forms a moving picture, in accordance with an encoding parameter serving as an index of an encoded data size;
   a picture type setting step that sets a picture type of the frame to be encoded by said encoding step;
   a detection step of detecting information associated with a cumulative size of encoded data during an encoding process of the frame in the encoding step;
   a comparison step of comparing the detected information with a plurality of thresholds which depend on the picture type set by said picture type setting step and are used for defining a plurality of zones, each of which indicates the level of the amount of encoded data in the encoding progress of said encoding step, where the plurality of thresholds for each picture type are set in advance; and
   an encoding parameter update step of updating the encoding parameter on the basis of a comparison result in the comparison step if the zone to which the information detected by said detection step belongs changes.

11. A computer-readable storage medium storing a computer program which serves as a moving picture encoding apparatus for compression-encoding moving picture data when said program is loaded and executed by a computer, said computer program functioning as:

an encoding unit that performs encoding for respective blocks, each of which includes a plurality of pixels in both horizontal and vertical directions, in one frame that forms a moving picture, in accordance with an encoding parameter serving as an index of an encoded data size;

a picture type setting unit that sets a picture type of the frame to be encoded by said encoding unit;

a detection unit that detects information associated with a cumulative size of encoded data during an encoding process of the frame by said encoding unit;

a comparison unit that compares the detected information with a plurality of thresholds which depend on the picture type set by said picture type setting unit and are used for defining a plurality of zones, each of which indicates the level of the amount of encoded data in the encoding progress of said encoding unit, where the plurality of thresholds for each picture type are set in advance; and an encoding parameter update unit that updates the encoding parameter on the basis of a comparison result of said comparison unit if the zone to which the information detected by said detection unit belongs changes.

* * * * *